United States Patent
Callanan et al.

(10) Patent No.: US 8,577,006 B2
(45) Date of Patent: *Nov. 5, 2013

(54) USER-DEFINED SYSTEM-ENFORCED SESSION TERMINATION IN A UNIFIED TELEPHONY ENVIRONMENT

(75) Inventors: Sean Callanan, Dublin (IE); Ruthie D. Lyle, Durhan, NC (US); Patrick J. O'Sullivan, Dublin (IE); Fred Raguillat, Dunboyne (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/483,218

(22) Filed: May 30, 2012

(65) Prior Publication Data

US 2012/0235814 A1    Sep. 20, 2012

Related U.S. Application Data

(63) Continuation of application No. 12/953,815, filed on Nov. 24, 2010.

(51) Int. Cl.
*H04M 3/42* (2006.01)

(52) U.S. Cl.
USPC ..................... 379/207.02; 370/261

(58) Field of Classification Search
USPC ............ 379/202.01, 203.01, 204.01, 205.01, 379/207.02; 370/260, 261
See application file for complete search history.

(56) References Cited

U.S. PATENT DOCUMENTS

| | | | |
|---|---|---|---|
| 6,236,326 B1 | 5/2001 | Murphy | |
| 6,912,382 B2 | 6/2005 | Fellenstein et al. | |
| 7,139,263 B2 | 11/2006 | Miller et al. | |
| 7,602,895 B2 | 10/2009 | Terry et al. | |
| 7,720,208 B1 | 5/2010 | Kiar et al. | |
| 8,005,075 B1 * | 8/2011 | Webster et al. | 370/352 |
| 2003/0069828 A1 * | 4/2003 | Blazey et al. | 705/37 |
| 2004/0087349 A1 | 5/2004 | Uno | |
| 2004/0203918 A1 | 10/2004 | Moriguchi et al. | |
| 2005/0047336 A1 * | 3/2005 | Decker et al. | 370/229 |
| 2006/0109786 A1 * | 5/2006 | Abdel-Kader et al. | 370/232 |
| 2009/0252159 A1 | 10/2009 | Lawson et al. | |
| 2010/0124321 A1 * | 5/2010 | Alexandrov et al. | 379/202.01 |
| 2011/0090822 A1 * | 4/2011 | Lee et al. | 370/260 |

* cited by examiner

*Primary Examiner* — Antim Shah
(74) *Attorney, Agent, or Firm* — Patents on Demand P.A.; Brian K. Buchheit; Scott M Garrett

(57) ABSTRACT

Enforcing user-defined real-time communication session terminations can begin with a termination enforcement handler identifying termination conditions applicable to a real-time communication session hosted by a unified telephony system. The termination conditions can define a limit for an operational variable for the unified telephony system or the real-time communication session. The identified termination conditions can be evaluated. If a termination condition is satisfied, it can be determined which participants are to be disconnected from the real-time communication session based upon handling rules for the termination conditions and/or termination preferences associated with the real-time communication session. The termination preferences can be defined by an initiating entity of the real-time communication session. The participants can be notified that their connection to the real-time communication session will be terminated in a predefined time limit. If the predefined time limit is reached, the participants' connection to the real-time communication session can be automatically terminated.

16 Claims, 5 Drawing Sheets

USER-DEFINED SYSTEM-ENFORCED SESSION TERMINATION IN A UNIFIED TELEPHONY ENVIRONMENT

CROSS-REFERENCE TO RELATED CASE

This application is a continuation of U.S. patent application Ser. No. 12/953,815, filed Nov. 24, 2010 (pending), which is incorporated herein in its entirety.

BACKGROUND

The present invention relates to the field of unified telephony computing and, more particularly, to user-defined system-enforced session termination in a unified telephony environment.

Unified telephony systems provide an organization with a single solution that encompasses a wide variety of real-time communication media (e.g., instant messaging, telephone access using voice over Internet protocol (VoIP), online collaboration, video conferencing, etc.).

BRIEF SUMMARY

One aspect of the present invention can include a method for enforcing user-defined real-time communication session terminations. Such a method can begin with a termination enforcement handler identifying termination conditions applicable to a real-time communication session hosted by a unified telephony system. The termination conditions can define a limit for an operational variable for the unified telephony system or the real-time communication session. The identified termination conditions can then be evaluated. If at least one termination condition is satisfied, it can be determined which participants are to be disconnected from the real-time communication session based upon handling rules for the termination conditions and/or termination preferences associated with the real-time communication session. The termination preferences can be defined by an initiating entity of the real-time communication session. The participants can be notified that their connection to the real-time communication session will be terminated in a predefined time limit. If the predefined time limit is reached, the participants' connection to the real-time communication session can be automatically terminated.

Another aspect of the present invention can include a system for enforcing user-defined real-time communication session terminations. Such a system can include a unified telephony system, a termination specification, and a termination enforcement handler. The unified telephony system can provide participants with real-time communication sessions. The termination specification can define the termination of an entire real-time communication session or one or more participants of a real-time communication session. Termination can be based upon a user-defined limit to the operating state of the unified telephony system. The termination enforcement handler can be configured to perform the termination as defined in the termination specification. Participants affected by the termination can be provided a predetermined amount of time prior to the termination.

Yet another aspect of the present invention can include a computer program product that includes a computer readable storage medium having embedded computer usable program code. The computer usable program code can be configured to identify termination conditions applicable to a real-time communication session hosted by a unified telephony system. The termination conditions can define a limit for an operational variable for the unified telephony system and/or the real-time communication session. The computer usable program code can be configured to evaluate the termination conditions. If a termination condition is satisfied, the computer usable program code can be configured to determine participants to disconnect from the real-time communication session based upon handling rules associated with the termination condition and/or termination preferences associated with the real-time communication session. The termination preferences can be defined by an initiating entity of the real-time communication session. Then, the computer usable program code can be configured to notify the participants of the termination of their connection to the real-time communication session in a predefined time limit. If the predefined time limit is reached, the computer usable program code can be configured to automatically terminate the connection of the participants to the real-time communication session.

DETAILED DESCRIPTION

Figure 1:
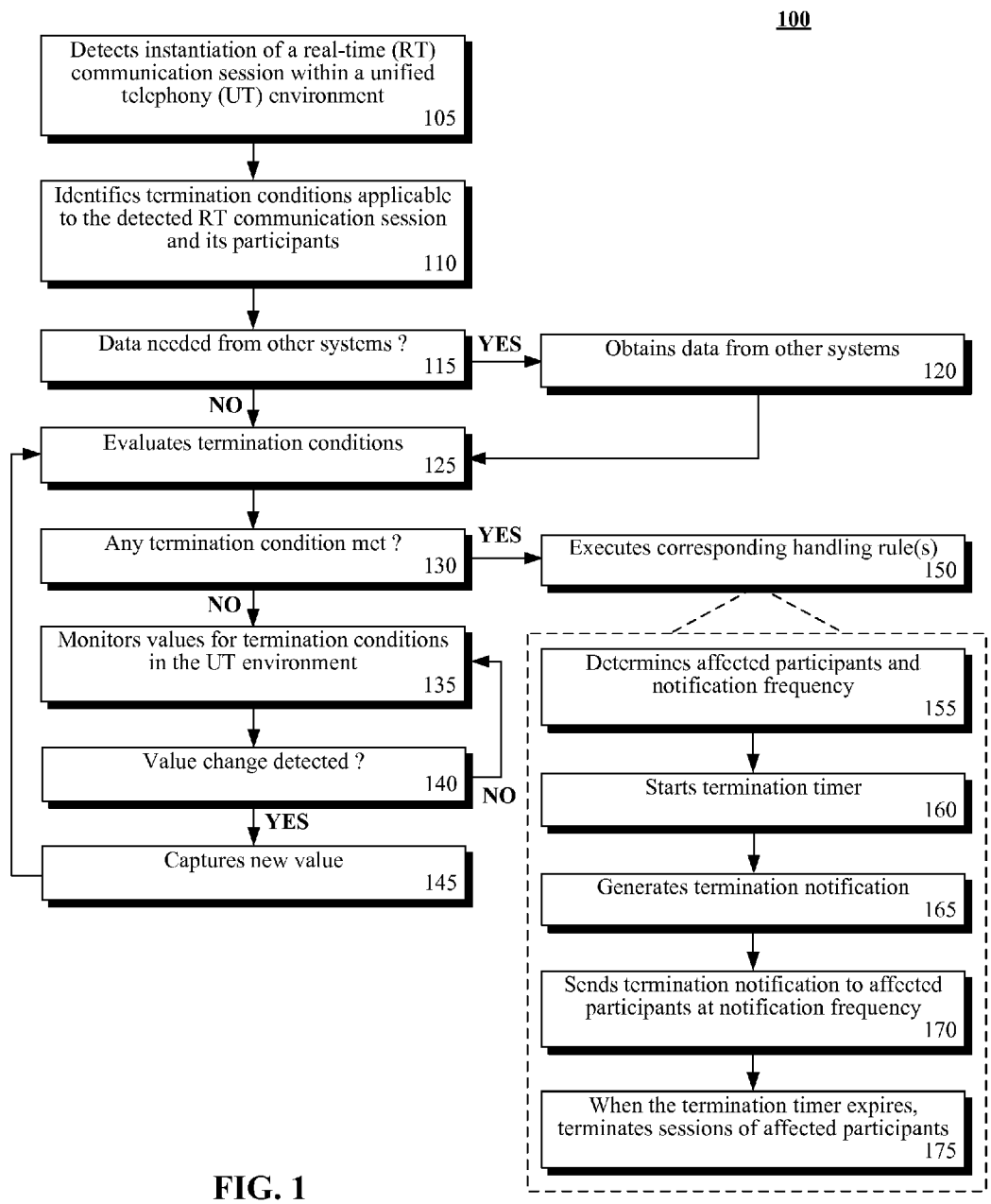
FIG. 1 is a flow chart of a method detailing an overview of the enforcement of user-defined session terminations in a unified telephony environment by a termination enforcement handler in accordance with embodiments of the inventive arrangements disclosed herein.

While performing activities in unified telephony systems, users are typically unaware of other impending events that should or will affect their session unless they constantly monitor other software applications or systems.

For example, a user working on a document in an online collaboration session is easily caught unaware that the collaboration server is being taken down for maintenance if they are not monitoring a maintenance schedule or a specifically contacted. Thus, if the server is shut down, the user loses their work.

Attempts to solve this problem place the burden of schedule knowledge upon the user. That is, it is up to the user to track the resources that they use and a current availability state of these resources. While such approaches work fine for scheduled outages, they do not accommodate outages that occur as a result of the dynamic nature of the unified telephony system and underlying network.

For example, heavy attendance for an online meeting degrades the overall performance of the unified telephony system. In order to meet predetermined performance levels, a system administrator simply disconnects participants from their sessions in the unified telephony system.

Disconnected users may not be provided any warning. Users may be disconnected arbitrarily or according to a variety of internal notes. Conventional unified telephony systems lack the ability to handle the session terminations in a graceful manner and adjust the order in which users should be terminated based upon user-configured parameters.

The disclosure provides a solution for enforcing a graceful termination of user's connection to a real-time communication session hosted by a unified telephony system. A termination enforcement handler can utilize a termination specification to determine at what time and in what order sessions and/or session connections are to be terminated. Participants affected by the termination can then be given a predetermined amount of time before termination (i.e., save documents, finish a conversation). During this time, the affected participants can be reminded by termination notifications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flow chart of a method 100 detailing an overview of the enforcement of user-defined session terminations in a unified telephony environment by a termination enforcement handler in accordance with embodiments of the inventive arrangements disclosed herein.

Method 100 can begin in step 105 where the termination enforcement handler can detect the instantiation of a real-time communication session within the UT environment. The unified telephony environment can represent a communications system that integrates multiple types of real-time communications media into a unified user interface like LOTUS SAMETIME UNIFIED TELEPHONY.

Examples of real-time communication sessions can include, but are not limited to, telephone calls (e.g., integrated land line connections, softphones using voice over Internet protocol (VoIP)), instant messaging sessions, chat rooms, online collaboration sessions, online meetings, and the like.

Termination conditions applicable to the detected real-time communication session and its participants can be identified in step 110. Termination conditions can represent user-defined variables pertaining to the individual participants, session, and/or the unified telephony environment that represent conditions under which participant connections to a real-time communication session or the entire real-time communication session should be terminated.

Termination conditions can be written for various levels of granularity within the unified telephony environment. For example, system administrators can define termination conditions based upon the overall operating state of the unified telephony environment, whereas a session moderator or initiator can define termination conditions specific to their real-time communication session.

In step 115, it can be determined if data is needed from other systems to evaluate the identified termination conditions. For example, a termination condition can be based upon a whether a participant has a scheduled event that overlaps or occurs immediately after the schedule end time of the real-time communication session. In such a situation, the termination enforcement handler can require data from an event scheduling or calendar system.

If data from another system is required, the data can be obtained from the corresponding system in step 120. Upon completion of step 120 or should data is not required from another system, step 125 can execute where the termination conditions can be evaluated.

The satisfaction of any of the termination conditions can be determined in step 130. If none of the termination conditions have been satisfied, flow can proceed to step 135 where the values corresponding to the applicable termination conditions of the unified telephony environment can be monitored.

For example, should a termination condition be based upon the total number of active sessions in the unified telephony environment, the termination enforcement handler would monitor the system variable representing that value.

It should be noted that it is assumed in method 100 that termination of the real-time communication session by the participants (i.e., all participants hang-up the phone) automatically terminates any activities (e.g., the monitoring of step 135) being performed by the termination enforcement handler for that real-time communication session.

In step 140, it can be determined if a change in a value being monitored has been detected. If a value change is not detected, flow returns to step 135 to continue monitoring the unified telephony environment, which will continue until a change is detected or the real-time communication session is terminated.

If a value change is detected, the new value can be captured in step 145. From step 145, flow can return to step 125 where the termination condition can be re-evaluated using the new value and progress through method 100.

If a termination condition for the real-time communication session is determined to be satisfied in step 130, the termination enforcement handler can execute the corresponding handling rules in step 150. The handling rules can represent configurable options pertaining to how the session terminations are performed.

For example, should the termination enforcement handler determine that four participants need to be terminated from a specific real-time communication session, the handling rules for the session (defined by the moderator/initiator and/or system administrator) can indicate that participants should be terminated based upon attendance order (i.e., last in, first out) and that participants identified as "management" (i.e., through use of an organizational directory) should not be terminated.

Performance of step 150 can include steps such as those shown in the dashed box. The termination enforcement handler can determine the participants affected by the termination conditions as well as the frequency at which the affected participants will be notified of their impending termination in step 155.

While it is the purpose of the termination enforcement handler to enforce session terminations, it should be emphasized that these terminations can be performed in a controlled manner. That is, the sessions of the affected participants are not immediately terminated without warning; the participants can be provided a set amount of time in which they can wrap up their discussion before their session is terminated.

In step 160, a termination timer can be started for the affected participants. The termination timer can be set for a predetermined time that represents the amount of time till the affected participants' sessions are terminated.

A termination notification can be generated in step 165. The termination notification can correspond to the types of real-time communication sessions being terminated. As such, multiple termination notifications may be generated in step 165 at a time that participants of different types of real-time communication sessions are being terminated.

In step 170, the termination notification can be sent to the affected participants according to the notification frequency. For example, the termination notification can be sent to the affected participants every two minutes, reminding them of the impending termination of their session.

Responsive to the termination timer expiring, the sessions of the affected participants can be terminated in step 175. Execution of step 175 can include the termination of an entire session, at a time where all the participants of that session are affected or the session itself is identified for termination, or termination of only the session connection of the affected participants, at a time where the entirety of the session is not to be terminated.

Figure 2:
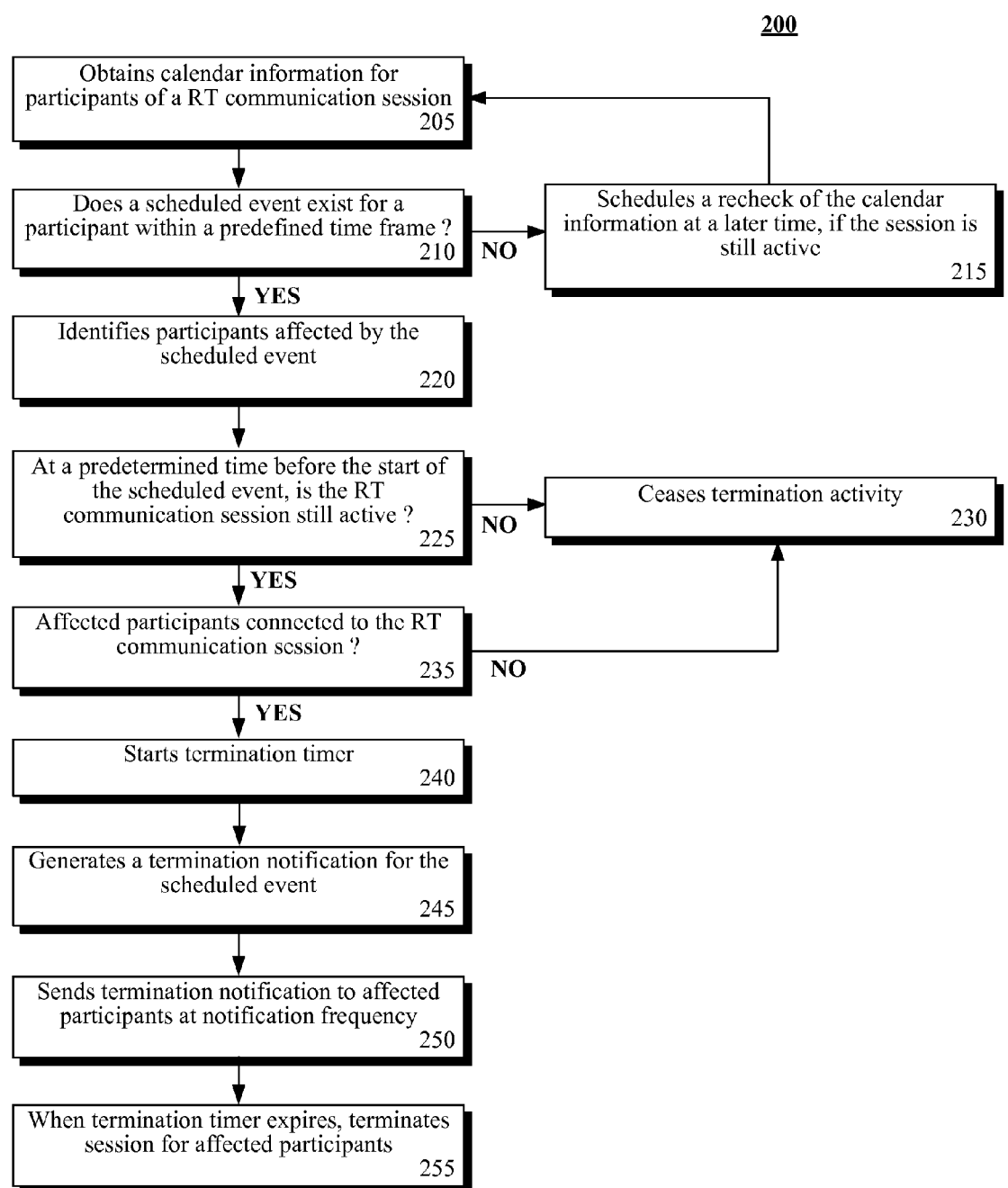
FIG. 2 is a flow chart of a method illustrating the use of the termination enforcement handler to enforce session terminations based upon scheduled calendar events in accordance with an embodiment of the inventive arrangements disclosed herein.

FIG. 2 is a flow chart of a method 200 illustrating the use of the termination enforcement handler to enforce session terminations based upon scheduled calendar events in accordance with embodiments of the inventive arrangements disclosed herein. Method 200 can represent a specific embodiment of method 100.

Method 200 can begin in step 205 where the termination enforcement handler can obtain calendar information for participants of a real-time communication session. It can be determined in step 210 if a scheduled event exists for a participant within a predefined time frame.

For example, the termination enforcement handler can assess the calendar information to determine if any participant has a scheduled event that occurs during, immediately after, and/or within thirty minutes after the scheduled end of the real-time communication session. If the real-time communication session is of a type that does not have a scheduled end time (e.g., chat room, instant messaging session), the current time can be used as the reference point (i.e., scheduled events within the next thirty minutes from now).

If a scheduled event does not exist for a participant within the predefined time frame, step 215 can execute where a recheck of the calendar information can be scheduled to be performed at a later time, if the real-time communication session is still active. From step 215, method 200 can return to step 205 to repeat the analysis of the calendar information at the later time in which the real-time communication session is still active.

For example, the calendar information can be rechecked at the scheduled end time of an online meeting, if the meeting is running long.

If a scheduled event does exist for a participant, step 220 can be performed where the participants affected by the scheduled event can be identified. In step 225, it can be determined if the real-time communication session is still active at a predetermined time before the start of the scheduled event.

If the session is no longer active, termination activity for the affected participant by the termination enforcement handler can cease in step 230. If the session is still active, step 235 can execute where the presence of the affected participants in the session can be determined.

If the affected participants are no longer connected to the real-time communication session, method 200 can flow to step 2350 where termination activity for the affected participant can cease. If the affected participants are still connected to the session, the termination time for the affected participants can be started in step 240.

In step 245, a termination notification can be generated for the scheduled event. Step 245 can allow for the termination notification to be dynamically tailored to include the details of the scheduled event as they pertain to each participant.

For example, a participant have a board meeting would receive a termination notification with the details of the upcoming board meeting, whereas the termination notification for a participant having an upcoming training class would reflect the details of the training class.

In this example, the termination timer can be set for the predetermined time before the start of the scheduled event. For example, if step 230 is set to occur fifteen minutes prior to the scheduled event, then the termination timer can be set to fifteen minutes.

The termination enforcement handler can send the termination notification to the affected participants at a defined notification frequency in step 250. If the termination timer expires, step 255 can be performed where the sessions of the affected participants can be terminated.

Figure 3:
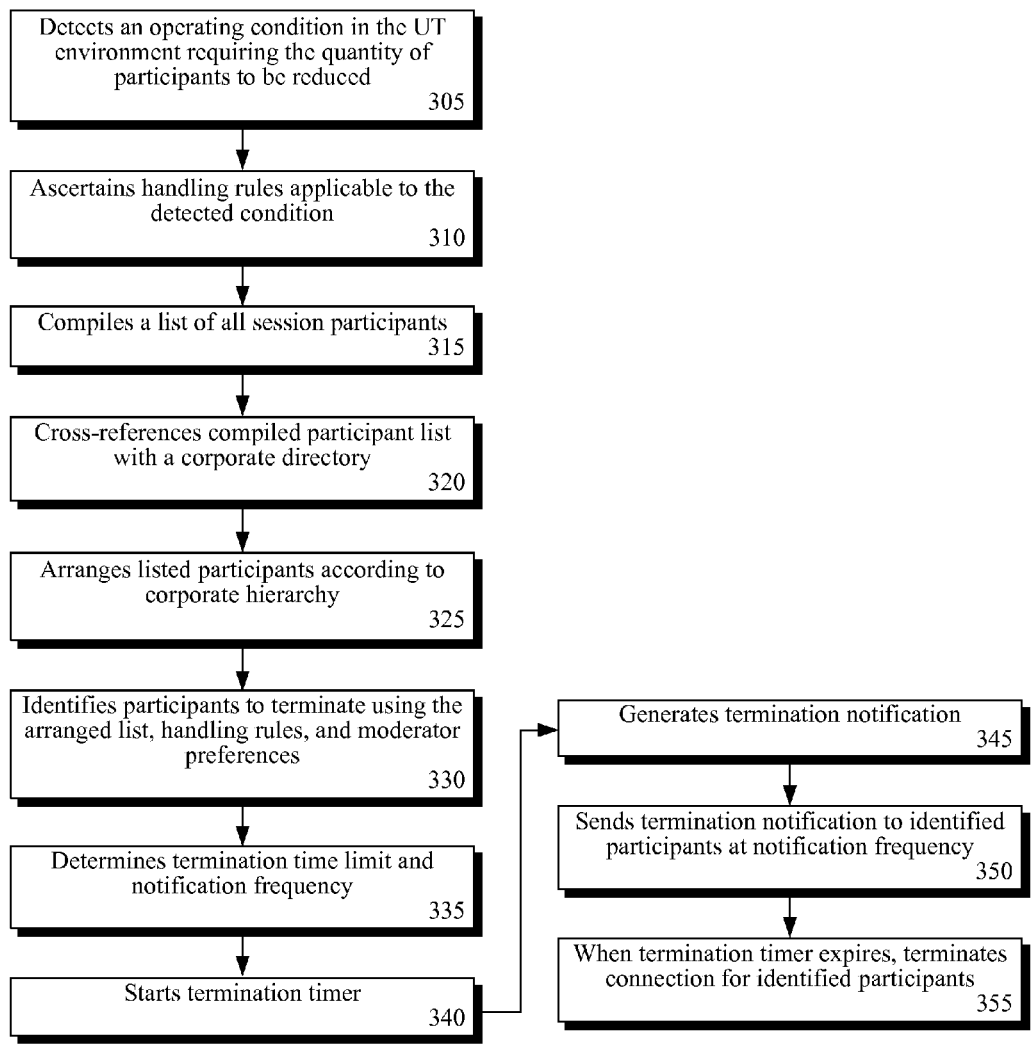
FIG. 3 is a flow chart of a method describing the use of corporate hierarchy data by a termination enforcement handler in accordance with an embodiment of the inventive arrangements disclosed herein.

FIG. 3 is a flow chart of a method 300 describing the use of corporate hierarchy data by a termination enforcement handler in accordance with embodiments of the inventive arrangements disclosed herein. Method 300 can represent a specific embodiment of method 100.

Method 300 can begin in step 305 where the termination enforcement handler can detect an operating condition within the UT environment that requires the quantity of participants to be reduced. For example, the unified telephony environment can be experiencing a heavy load or a reduction in available bandwidth that requires session participants to be terminated in order to meet quality of service or performance levels.

The handling rules applicable to the detected condition can be ascertained in step 310. In step 315, a list of all session participants can be compiled. It should be noted that, in this example, the list compiled in step 315 can contain the participants of all sessions currently active in the unified telephony environment, regardless of type.

The compiled participant list can be cross-references with a corporate directory in step 320. In step 325, the listed participants can be arranged according to the corporate hierarchy presented in the corporate directory.

Using the arranged list, handling rules and moderator preferences, participants can be identified for termination in step 330. Step 330 can include various algorithms for resolving instances where handling rules and moderator preferences conflict.

For example, a general handling rule can exist stating that participants denoted as "Team Member" are terminated before those marked as "Supervisor". However, in a particular online meeting, the moderator can have identified certain participants as immune from termination (i.e., participants absolutely required in attendance). As such, a "Supervisor" participant not identified by the moderator as immune would be terminated, while a "Team Member" participant identified as immune would not.

In step 335, the time limit for termination and the notification frequency can be determined. The termination timer for the determined time limit can be started in step 340. In step 345, the termination notification can be generated.

The termination notification can then be sent to the identified participant according to the notification frequency in step 350. In step 355, the connection of the identified participants can be terminated, responsive to the termination timer expiring.

Figure 4:
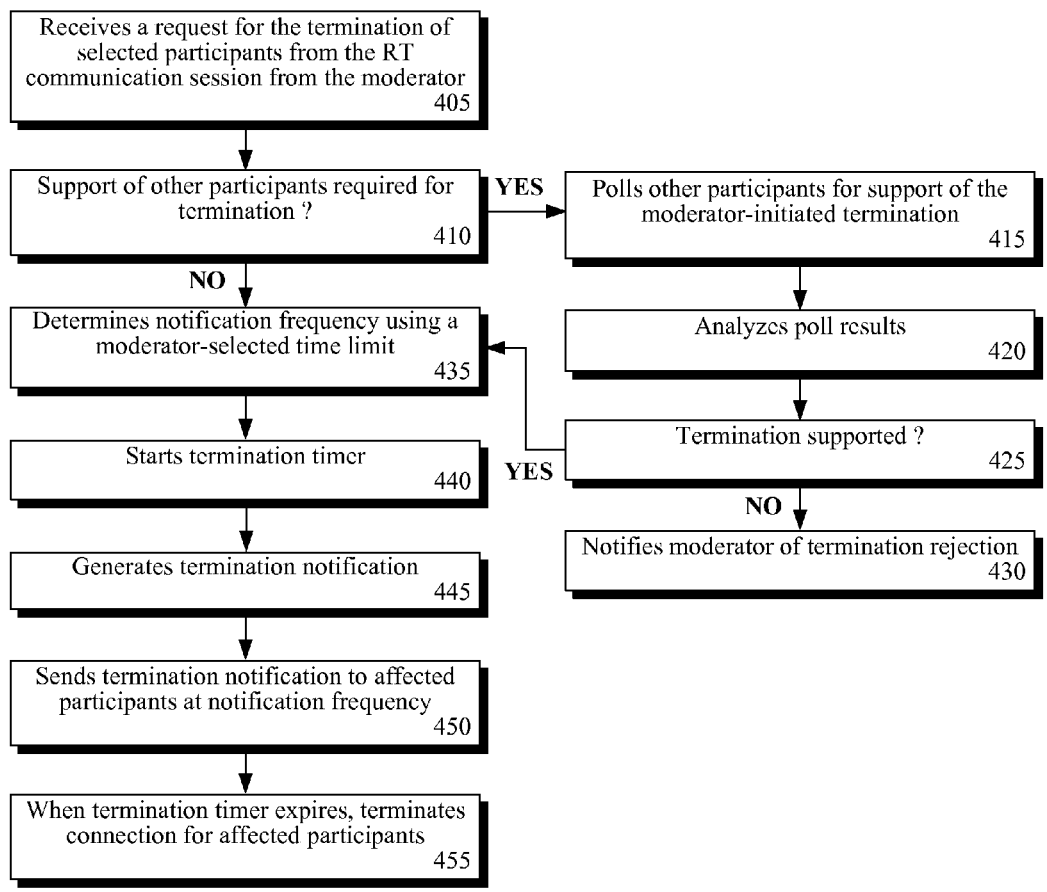
FIG. 4 is a flow chart of a method describing the enforcement of moderator-initiated termination of participants from a real-time communication session by the termination enforcement handler in accordance with embodiments of the inventive arrangements disclosed herein.

FIG. 4 is a flow chart of a method 400 describing the enforcement of moderator-initiated termination of participants from a real-time communication session in a unified telephony environment by the termination enforcement handler in accordance with embodiments of the inventive arrangements disclosed herein. Method 400 can represent a specific embodiment of method 100.

Method 400 can begin in step 405 where the termination enforcement handler can receive a request for the termination of selected participants from the real-time communication session from the session moderator or initiator. It can be determined if the support of the other participants is required to enact the termination in step 410.

Should participant support be required, step 415 can execute where the termination enforcement handler can poll the other participants of the real-time communication session for their support of the moderator-initiated termination. The poll results can then be analyzed in step 420.

In step 425, it can be determined if the moderator-initiated termination is supported. This determination can utilize a variety of approaches, such as majority rules, vote weighting based upon corporate hierarchy, and so on. If the termination of the selected participants is not supported, the moderator can be notified of the rejection in step 430.

If the termination is supported or if the support of the other participants is not required for termination, step 435 can execute where the notification frequency can be determined using the time limit selected by the moderator. The termination timer for the selected time limit can be started in step 440.

In step 445, the termination notification can be generated. The termination notification can then be sent to the affected participants according to the notification frequency in step 450. In step 455, the connection of the affected participants can be terminated, response to the termination timer expiring.

Figure 5:
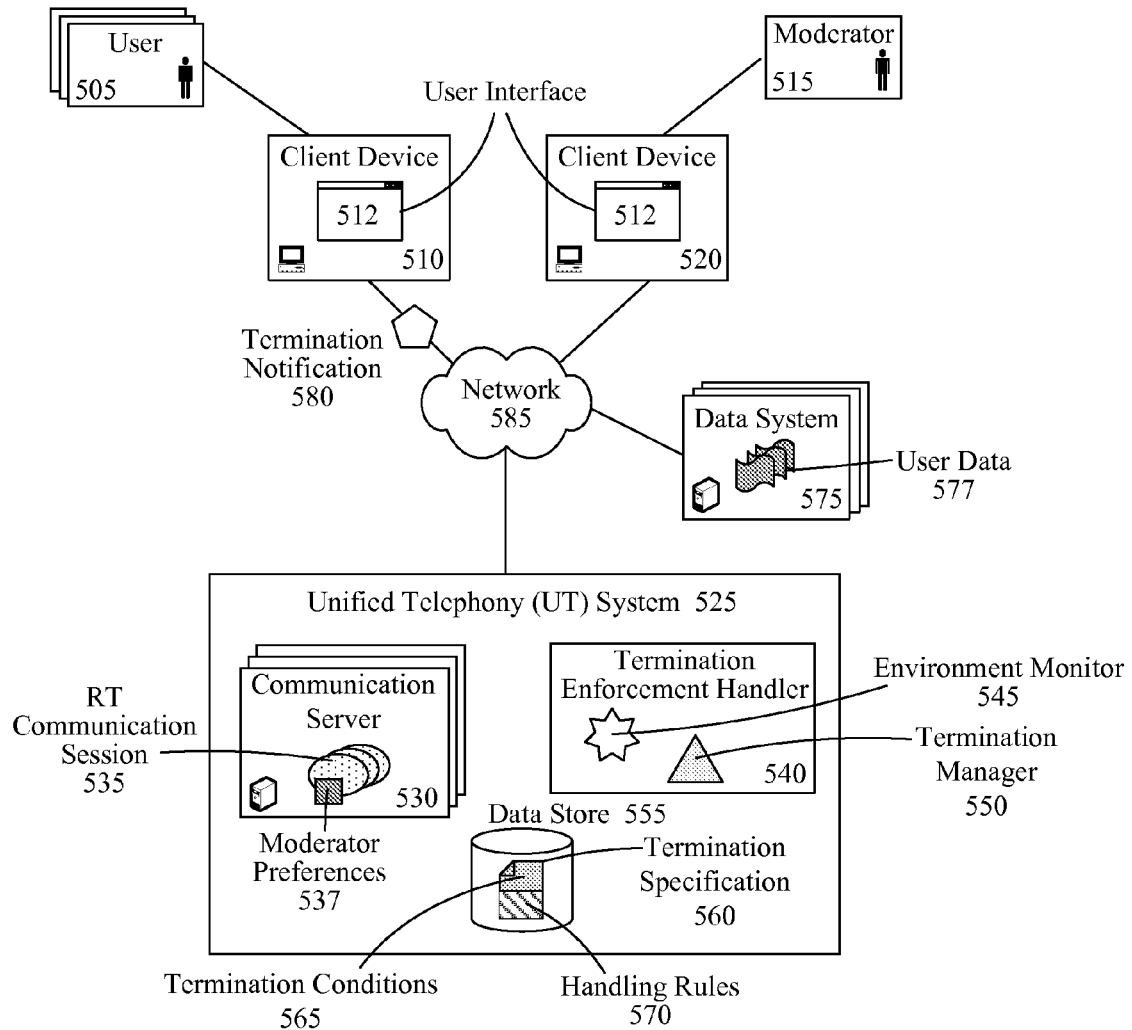
FIG. 5 is a schematic diagram illustrating a system implementing the enforcement of user-defined session terminations in a unified telephony system by a termination enforcement handler in accordance with embodiments of the inventive arrangements disclosed herein.

FIG. 5 is a schematic diagram illustrating a system 500 implementing the enforcement of user-defined session 535 terminations in a unified telephony system 525 by a termination enforcement handler 545 in accordance with embodiments of the inventive arrangements disclosed herein. System 200 can be configured to perform the steps of methods 100, 200, 300, and/or 400.

In system 500, users 505 and a moderator 515 can interact with each other in a real-time communication session 535 of a unified telephony system 525 over a network 585. The moderator 515 can represent a designated user 505 who is in charge of or who initiated the real-time communication session 535.

Interaction between the users 505 and/or moderator 515 can be performed using a user interface 512 of the unified telephony system 525 running on a client device 510 and 520. The client device 510 and 520 can represent a variety of computing devices capable of running the user interface 512 and communicating with the unified telephony system 525 over the network 585.

The user interface 512 can represent a graphical user interface (GUI) in which the users 505 and/or moderator 515 can perform actions appropriate for the type of real-time communication session 535.

The unified telephony system 525 can represent the hardware and/or software components required to support the various types of real-time communication sessions 535. The unified telephony system 525 can include communication servers 530, a termination enforcement handler 540, and a data store 555 containing a termination specification 560.

The communication servers 530 can represent the hardware and/or software components that support the data exchanges for the specific type of real-time communication session 535 being performed. For example, a telephony server 530 can handle telephone communications, whereas an instant messaging server 530 would handle instant messaging communications.

Each phone call, instant messaging exchange, or online meeting can be represented as a real-time communication session 535 by the corresponding communication server 530. A real-time communication session 535 can be configured to include moderator preferences 537.

The moderator preferences 537 can represent configurable parameters regarding termination priority for the users 505 participating in the real-time communication session 535. As the name implies, these parameters can be set by the moderator 515 at a time that the real-time communication session 535 is defined.

The termination enforcement handler 540 can represent the software component of the unified telephony system 525 that enforces the termination of users 505 and/or real-time communication sessions 535 based upon the termination specification 560. The termination specification 560 can define termination conditions 565 and handling rules 570.

The termination conditions 565 can define limits for operating parameters of the unified telephony system 525 and/or user-specific circumstances that, upon being met, require termination of user 505 connections and/or entire real-time communication sessions 535. Values for the user-specific circumstances can be obtained from the user data 577 housed by various data systems 575.

For example, a termination condition 565 based upon schedule or calendar information can require accessing the user's 505 calendar data 577 that is stored in the calendar system 575.

Termination conditions 565 can be defined in the user interface 512 by users 505 having the appropriate security privileges and/or administrators of the unified telephony system 525. Further, the scope of the termination conditions 565 can vary in granularity.

The handling rules 570 can define attribute values and/or priorities that affect the manner in which the termination of a user's 505 connection or a real-time communication session 535 is conducted on a general basis. Handling rules 570 can be similar to moderator preferences 537; handling rules 570 can apply to the entire unified telephony system 525, whereas moderator preferences 537 can apply to only a single instance of a real-time communication session 535.

Like termination conditions 565, the handling rules 570 can require values of user data 577 from other data systems 575. For example, if a handling rule 570 is based upon an employee categorization, then the employee categorization data 577 for the participating users 505 can be accessed from the appropriate data system 575, such as a human resources system 575.

The termination enforcement handler 540 can include an environment monitor 545 and a termination manager 550. The environment monitor 545 can represent the element of the termination enforcement handler 540 that keeps track of the operating environment of the unified telephony system 525 with respect to the termination conditions 565.

For example, if a termination condition 565 is based upon the server load of the instant messaging server 530, then the environment monitor 545 would monitor the corresponding environmental variables in order to evaluate the termination condition 565.

The termination manager 550 can represent the software component of the termination enforcement handler 540 that handles generates and sends termination notifications 580 to the users 505 who are going to be disconnected from their real-time communication session 535. The termination notification 580 can represent a message that informs the receiving user 505 of their impending termination from the real-time communication session 535.

The format of the termination notification 580 can correspond to the type of real-time communication session 535 (i.e., an instant message for an instant messaging session, an audio message for a telephone session). Adjustments to the handling of termination notifications 580 can be included as part of the moderator preferences 537 and/or handling rules 570.

For example, users 505 participating in an online meeting that utilizes audio and graphics can receive termination notifications 580 in audio and/or textual formats.

Network 585 can include any hardware/software/and firmware necessary to convey data encoded within carrier waves. Data can be contained within analog or digital signals and conveyed though data or voice channels. Network 585 can include local components and data pathways necessary for communications to be exchanged among computing device components and between integrated device components and peripheral devices. Network 585 can also include network equipment, such as routers, data lines, hubs, and intermediary servers which together form a data network, such as the Internet. Network 585 can also include circuit-based communication components and mobile communication components, such as telephony switches, modems, cellular communication towers, and the like. Network 585 can include line based and/or wireless communication pathways.

As used herein, presented data store 555 can be a physical or virtual storage space configured to store digital information. Data store 555 can be physically implemented within any type of hardware including, but not limited to, a magnetic disk, an optical disk, a semiconductor memory, a digitally encoded plastic memory, a holographic memory, or any other recording medium. Data store 555 can be stand-alone storage units as well as a storage unit formed from a plurality of physical devices. Additionally, information can be stored within data store 555 in a variety of manners. For example, information can be stored within a database structure or can be stored within one or more files of a file storage system, where each file may or may not be indexed for information searching purposes. Further, data store 555 can utilize one or more encryption mechanisms to protect stored information from unauthorized access.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:

identifying of at least one termination condition applicable to a real-time communication session hosted by a unified telephony system by a termination enforcement handler, wherein the at least one termination condition defines a limit for an operational variable for at least one of the unified telephony system and the real-time communication session, wherein the operational variable comprises at least one of a quality of service level, a performance level of the unified telephony system, a bandwidth availability, a quantity of participants for the real-time communication session, a total quantity of real-time communication sessions in the unified telephony system, a total quantity of a specific type of real-time communication sessions, a server load, and a maintenance schedule for resources of the unified telephony system;

evaluating the at least one termination condition;

in response to at least one termination condition being satisfied, determining at least one participant of the real-time communication session to disconnect from the real-time communication session based upon at least one of handling rules associated with the at least one termination condition and termination preferences associated with the real-time communication session, wherein the termination preferences are defined by an initiating entity of the real-time communication session;

notifying the at least one participant of the real-time communication session of a termination of their connection to the real-time communication session in a predefined time limit, wherein notifying the at least one participant of termination further comprises:

generating a termination notification for the at least one participant;

determining a notification frequency for the termination notification to the at least one participant based upon at least one of handling rules and termination preferences;

initiating a termination timer expressing the predefined time limit; and sending the termination notification to the at least one participant according to a time indicated on the termination timer and the notification frequency, wherein a format of the termination notification is based upon media types supported by the real-time communication session, handling rules, and termination preferences; and in response to the predefined time limit being reached, automatically terminating the connection of the at least one participant to the real-time communication session.

2. The method of claim 1, wherein the evaluating of the at least one termination condition further comprises:

ascertaining a need for data from an auxiliary data system to represent the operational variable of a corresponding termination condition; and requesting said data from the auxiliary data system for participants of the real-time communication session, wherein the data comprises at least one of calendar data, corporate directory data, personnel data, and project scheduling data.

3. The method of claim 1, wherein the handling rules represent one or more configurable options associated with the termination of the real time communication session.

4. The method of claim 1, wherein the determining at least one participant to disconnect further comprises:

ascertaining a need for data pertaining to participants of the real-time communication session from an auxiliary data system;

requesting said data from the auxiliary data system;

arranging a list of the participants in a termination order based upon the data received from the auxiliary data system and applicable handling rules and termination preferences, wherein the termination order expresses a preference in which the participants are to be terminated from the real-time communication session; and selecting the at least one participant to disconnect from the arranged list according to the termination order.

5. The method of claim 4, wherein arranging of the list further comprises:

identifying participants immune to disconnection from the real-time communication session, wherein said immunity is defined in at least one of a handling rule or a termination preference; and removing the identified participants from the list.

6. The method of claim 1, further comprising:

in response to the at least one termination condition being unsatisfied, monitoring a value of the operational variable of the at least one termination condition;

in response to a change in the value being detected, capturing the changed value; and re-executing the evaluation of the at least one termination condition.

7. The method of claim 1, wherein, upon the initiating entity of the real-time communication session manually invoking termination of the at least one participant by the termination enforcement handler, said method further comprising:

determining a need for support from other participants of the real-time communication session to terminate at least one participant selected by the initiating entity from the real-time communication session, wherein the other participants excludes the at least one participant selected by the initiating entity;

upon a determination that support is needed, polling the other participants for their support;

analyzing results of the polling; and in response to the results of the polling indicating support for termination of the at least one participant selected by the initiating entity, executing the notification and termination of the at least one selected participant.

8. The method of claim 7, further comprising:

in response to the results of the polling being to reject termination of the at least one selected participant, informing the initiating entity of said rejection.

9. The method of claim 1, further comprising:

checking calendar information of participants of the real time communication session;

determining, based on the calendar information, whether a scheduled event exists for a participant of the real time communication session;

identifying other participants of the real time communication session affected by the scheduled event; and terminating the identified participants from the real time communication session when the real time communication session is still active at a predetermined time before the start of the scheduled event, wherein the real time communication session is terminated based upon handling rules and termination preferences, wherein participants affected by termination are provided a predetermined amount of time prior to being terminated.

10. The method of claim 9, further comprising performing a recheck of the calendar information at a later time if no scheduled event exists for the participant of the real time communication session, wherein the recheck is performed only if the real time communication session is active at the later time.

11. The method of claim 9, further comprising ceasing termination of the real time communication session if the affected participants are not connected to the real time communication session.

12. The method of claim 1, further comprising:

detecting an operating condition of the unified telephony system requiring a quantity of participants of the real time communication session to be reduced;

ascertaining handling rules and termination preferences applicable to the detected operating condition;

compiling a list of participants of a plurality of real time communication sessions of the unified telephony system;

arranging the list of participants according to a corporate hierarchy based on a comparison of the list of participants with a corporate directory;

identifying participants to be terminated from the real time communications session based on the arranged list; and terminating the identified participants from the real time communication session, wherein the real time communication session is terminated based upon the ascertained handling rules and termination preferences, wherein participants affected by termination are provided a predetermined amount of time prior to being terminated.

13. The method of claim 12, wherein the identified participants are terminated from the real time communication session based on an ascending order of the corporate hierarchy.

14. The method of claim 1, wherein an order of a plurality of real time communication sessions to be terminated is determined using a termination specification.

15. A method comprising:

identifying of at least one termination condition applicable to a real-time communication session hosted by a unified telephony system by a termination enforcement handler, wherein the at least one termination condition defines a limit for an operational variable for at least one of the unified telephony system and the real-time communication session, wherein the operational variable comprises at least one of a quality of service level, a performance level of the unified telephony system, a bandwidth availability, a quantity of participants for the real-time communication session, a total quantity of real-time communication sessions in the unified telephony system, a total quantity of a specific type of real-time communication sessions, a server load, and a maintenance schedule for resources of the unified telephony system;

evaluating the at least one termination condition;

in response to at least one termination condition being satisfied, determining at least one participant of the real-time communication session to disconnect from the real-time communication session based upon at least one of handling rules associated with the at least one termination condition and termination preferences associated with the real-time communication session, wherein the termination preferences are defined by an initiating entity of the real-time communication session;

notifying the at least one participant of the real-time communication session of a termination of their connection to the real-time communication session in a predefined time limit;

in response to the predefined time limit being reached, automatically terminating the connection of the at least one participant to the real-time communication session;

checking calendar information of participants of the real time communication session;

determining, based on the calendar information, whether a scheduled event exists for a participant of the real time communication session;

identifying other participants of the real time communication session affected by the scheduled event;

terminating the identified participants from the real time communication session when the real time communication session is still active at a predetermined time before the start of the scheduled event, wherein the real time communication session is terminated based upon handling rules and termination preferences, wherein participants affected by termination are provided a predetermined amount of time prior to being terminated; and ceasing termination of the real time communication session if the affected participants are not connected to the real time communication session.

16. A method comprising:

identifying of at least one termination condition applicable to a real-time communication session hosted by a unified telephony system by a termination enforcement handler, wherein the at least one termination condition defines a limit for an operational variable for at least one of the unified telephony system and the real-time communication session, wherein the operational variable comprises at least one of a quality of service level, a performance level of the unified telephony system, a bandwidth availability, a quantity of participants for the real-time communication session, a total quantity of real-time communication sessions in the unified telephony system, a total quantity of a specific type of real-time communication sessions, a server load, and a maintenance schedule for resources of the unified telephony system;

evaluating the at least one termination condition;

in response to at least one termination condition being satisfied, determining at least one participant of the real-time communication session to disconnect from the real-time communication session based upon at least one of handling rules associated with the at least one termination condition and termination preferences associated with the real-time communication session, wherein the termination preferences are defined by an initiating entity of the real-time communication session;

notifying the at least one participant of the real-time communication session of a termination of their connection to the real-time communication session in a predefined time limit; and in response to the predefined time limit being reached, automatically terminating the connection of the at least one participant to the real-time communication session;

detecting an operating condition of the unified telephony system requiring a quantity of participants of the real time communication session to be reduced;

ascertaining handling rules and termination preferences applicable to the detected operating condition;

compiling a list of participants of a plurality of real time communication sessions of the unified telephony system;

arranging the list of participants according to a corporate hierarchy based on a comparison of the list of participants with a corporate directory;

identifying participants to be terminated from the real time communications session based on the arranged list; and terminating the identified participants from the real time communication session, wherein the real time communication session is terminated based upon the ascertained handling rules and termination preferences, wherein participants affected by termination are provided a predetermined amount of time prior to being terminated.

* * * * *